(12) United States Patent
Miyake et al.

(10) Patent No.: US 7,373,409 B2
(45) Date of Patent: May 13, 2008

(54) DATA FILE TRANSFER CONTROLLING DEVICE

(75) Inventors: Keiji Miyake, Gifu-ken (JP); Masashi Kuno, Oobu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 704 days.

(21) Appl. No.: 10/424,691

(22) Filed: Apr. 29, 2003

(65) Prior Publication Data

US 2003/0208564 A1 Nov. 6, 2003

(30) Foreign Application Priority Data

May 1, 2002 (JP) .............................. 2002-129838

(51) Int. Cl.
*G06F 15/16* (2006.01)
*G06F 15/173* (2006.01)

(52) U.S. Cl. ...................... 709/229; 709/203; 709/224; 709/226; 718/104

(58) Field of Classification Search ................ 709/201, 709/213, 216, 223, 224, 226, 229; 718/104, 718/105

See application file for complete search history.

(56) References Cited

U.S. PATENT DOCUMENTS

| 5,014,221 A * | 5/1991 | Mogul ........................ 358/1.14 |
| 6,513,073 B1 * | 1/2003 | Kawai et al. ................... 710/1 |
| 7,065,586 B2 * | 6/2006 | Ruttenberg et al. .......... 709/244 |
| 2001/0050920 A1 * | 12/2001 | Hassell et al. .............. 370/465 |
| 2002/0049826 A1 | 4/2002 | Ariga |

FOREIGN PATENT DOCUMENTS

| JP | A 11-073360 | 3/1999 |
| JP | B2 2903917 | 3/1999 |
| JP | A 11-205379 | 7/1999 |
| JP | A 11-219277 | 8/1999 |
| JP | A 2000-020268 | 1/2000 |
| JP | A 2002-116945 | 4/2002 |

OTHER PUBLICATIONS

U.S. Appl. No. 10/424,754, filed Apr. 29, 2003, Nishihara et al.
"Our Own Experience! Live coverage of remote proof printing," DTP World, Japan, Works Corporation Inc., Jul. 13, 2001, vol. 6, No. 7, pp. 81-97.

* cited by examiner

*Primary Examiner*—Ario Etienne
*Assistant Examiner*—El Hadji M Sall
(74) *Attorney, Agent, or Firm*—Oliff & Berridge, PLC

(57) ABSTRACT

When an image file exists in a folder determined to be the source of a file transfer according to the nth entry of file transfer data, a free space determining unit provided in an image processing device determines whether a work area on the hard disk meets or exceeds a required capacity. If the work area meets or exceeds the required capacity, a FTP client requests an FTP server to transfer the image file. As a result, an image file in a folder that is identified by the nth entry of the file transfer data to be the source of the transfer is transferred to a hot folder identified by the file transfer data to be the destination. Hence, by reliably allocating a work area required for image processing on the hard disk that accommodates the hot folder, it is possible to increase the stability of image processing without stalls and failures in the processing.

19 Claims, 13 Drawing Sheets

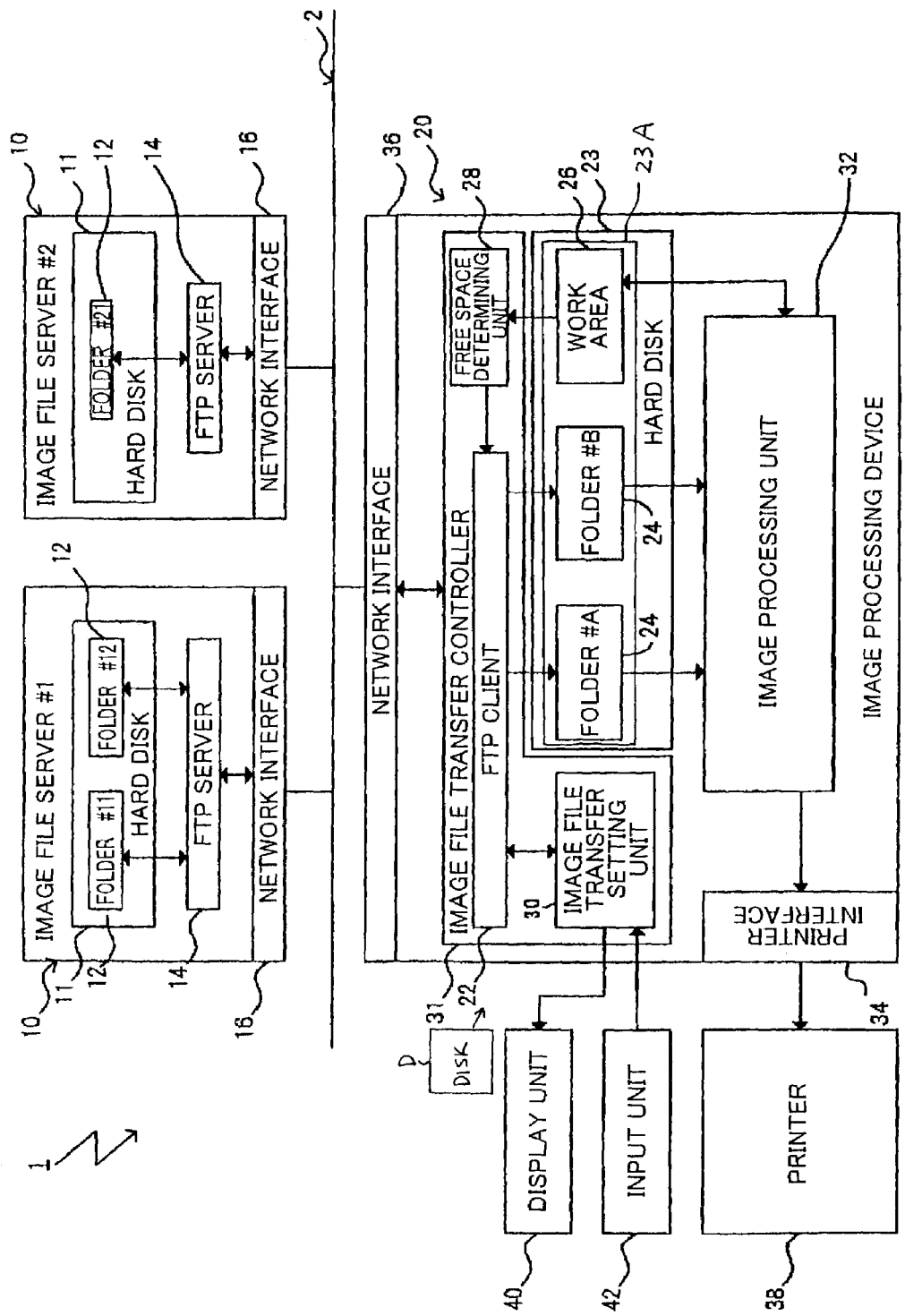

INITIAL WINDOW IN PROCESS FOR SETTING FILE TRANSFER DATA (1)

CONNECTION SETTINGS WINDOW

FILE TRANSFER DATA SETTINGS WINDOW

INITIAL WINDOW IN PROCESS FOR SETTING FILE TRANSFER DATA (2)

ADVANCED SETTINGS WINDOW

FIG. 5

TABLE OF FILE TRANSFER DATA

| SETTING | SERVER | LOGIN NAME | PASSWORD | PROTOCOL | SOURCE | DESTINATION | POST-PROCESS |
|---|---|---|---|---|---|---|---|
| ENLARGE 200% | Server1 | anonymous | abc@domain | AT | a:/tmp/ | d:/enlarge 200% | DELETE |
| SAMPLE | Server2 | anonymous | mail@domain | ftp | b:/tmp/ | d:/sample | .bak |
| ENLARGE Ume | Ume | UEDA | 0123 | ftp | c:/data/large | d:/enlarge | .bak |
| STANDARD Ume | Ume | TAKA | aabb | ftp | c:/data/std | d:/standard | .bak |
| REDUCE Ume | Ume | UEDA | 0123 | ftp | c:/data/small | d:/reduce | .bak |
| ENLARGE Matsu | matsu | UEDA | 4567 | win | d:/tmp/wide | d:/enlarge | e:/store |
| REDUCE Matsu | matsu | UEDA | 4567 | win | e:/tmp/normal | d:/standard | e:/store |
| | | | | | | | |

FIG. 8

TABLE OF FOLDER DATA

| SERVER | FOLDER | PRIORITY |
|---|---|---|
| Ume | ···/tmp/wide | 1 |
| Ume | ···/tmp/normal | 3 |
| Ume | ···/tmp/small | |
| Sakura | ···/std/large | 2 |
| Sakura | ···/std/normal | 4 |
| | | |
| | | |

FIG. 9

TABLE OF FILE TYPES

| TYPE | COEFFICIENT |
|---|---|
| .tiff | 1 |
| .ps | 10 |
| | |
| | |
| | |

DATA FILE TRANSFER CONTROLLING DEVICE

BACKGROUND OF THE INVENTION

1. Field of the Invention

The present invention relates to a data file transfer controlling device used in a data file processing system including data file servers and a data file processing device that are connected with each other and that can transfer and receive data files among each other over a network.

2. Description of Related Art

There is well known an image processing system including image file servers connected to and capable of communicating with an image processing device via a network. Such an image processing system is disclosed in Japanese unexamined patent application publication No. HEI-11-205379.

In this type of image processing system, image files are transferred from the image file servers to the image processing device and are processed on the image processing device. While the image files are being processed, it is impossible to process other image files. Accordingly, in order to process the other image files, it is necessary to wait until the current image process has completed. During this time, those image files waiting to be processed are temporarily stored in a storage area provided in the image processing device.

SUMMARY OF THE INVENTION

However, when image files of a large capacity are waiting to be processed and are temporarily stored in the storage area, the free space in the storage area is reduced and can interfere with the image file process. This same problem occurs in data file processing systems that treat files other than image files, such as document files.

In view of the foregoing, it is an object of the present invention to provide a data file transfer controlling device capable of controlling the transfer of data files, while achieving stable data file processing.

In order to attain the above and other objects, the present invention provides a data file transfer controlling device for controlling transfer of a data file from a data file server to a data file processing device, the data file processing device processing a data file after temporarily storing the data file in a processing storage area defined in a memory area provided in the data file processing device, the data file transfer controlling device comprising: a free space judging portion judging whether a capacity of a free space is greater than or equal to a required capacity for transfer of a data file, the free space being defined in a memory area provided in a data file processing device at its region other than a processing storage area, to which the data file is to be transferred; and a transfer controlling portion allowing the data file to be transferred from the data file server to the data file processing device when the free space judging portion determines that the free space is greater than or equal to the required capacity and failing to allow the data file to be transferred from the data file server to the data file processing device when the free space judging portion determines that the free space is less than the required capacity.

According to another aspect, the present invention provides a data file processing device, comprising: a data file processing unit including a memory area having a processing storage area, the data file processing unit processing a data file after temporarily storing the data file in the processing storage area defined in the memory area; and a data file transfer controlling unit controlling transfer of a data file from a data file server to the data file processing unit, the data file transfer controlling unit including: a free space judging portion judging whether a capacity of a free space is greater than or equal to a required capacity for transfer of a data file, the free space being defined in the memory area provided in the data file processing unit at its region other than the processing storage area, to which the data file is to be transferred; and a transfer controlling portion allowing the data file to be transferred from the data file server to the data file processing unit when the free space judging portion determines that the free space is greater than or equal to the required capacity, the data file processing unit receiving the transferred data file and processing the received data file after temporarily storing the data file in the processing storage area, the transfer controlling portion failing to allow the data file to be transferred from the data file server to the data file processing unit when the free space judging portion determines that the free space is less than the required capacity.

According to a further aspect, the present invention provides a printing device, comprising: a data file transfer controlling unit controlling transfer of a data file from a data file server to a data file processing unit, the data file processing unit processing a data file after temporarily storing the data file in a processing storage area defined in a memory area provided in the data file processing unit, the data file transfer controlling unit including: a free space judging portion judging whether a capacity of a free space is greater than or equal to a required capacity for transfer of a data file, the free space being defined in a memory area provided in a data file processing unit at its region other than a processing storage area, to which the data file is to be transferred; and a transfer controlling portion allowing the data file to be transferred from the data file server to the data file processing unit when the free space judging portion determines that the free space is greater than or equal to the required capacity and failing to allow the data file to be transferred from the data file server to the data file processing unit when the free space judging portion determines that the free space is less than the required capacity; and a printing portion printing the data file that has been processed by the data file processing unit.

According to another aspect, the present invention provides a data file transfer controlling program executed by a computer for controlling transfer of a data file from a data file server to a data file processing device, the data file processing device processing a data file after temporarily storing the data file in a processing storage area defined in a memory area provided in the data file processing device, the data file transfer controlling program comprising the programs of: judging whether a capacity of a free space is greater than or equal to a required capacity for transfer of a data file, the free space being defined in a memory area provided in a data file processing device at its region other than a processing storage area, to which the data file is to be transferred; and allowing the data file to be transferred from the data file server to the data file processing device when it is determined that the free space is greater than or equal to the required capacity and failing to allow the data file to be transferred from the data file server to the data file processing device when it is determined that the free space is less than the required capacity.

According to still another aspect, the present invention provides a storage medium that can be read by a computer and that stores a data file transfer controlling program executed by a computer for controlling transfer of a data file from a data file server to a data file processing device, the data file processing device processing a data file after temporarily storing the data file in a processing storage area defined in a memory area provided in the data file processing device, the data file transfer controlling program comprising the programs of: judging whether a capacity of a free space is greater than or equal to a required capacity for transfer of a data file, the free space being defined in a memory area provided in a data file processing device at its region other than a processing storage area, to which the data file is to be transferred; and allowing the data file to be transferred from the data file server to the data file processing device when it is determined that the free space is greater than or equal to the required capacity and failing to allow the data file to be transferred from the data file server to the data file processing device when it is determined that the free space is less than the required capacity.

BRIEF DESCRIPTION OF THE DRAWINGS

The above and other objects, features and advantages of the invention will become more apparent from reading the following description of the preferred embodiments taken in connection with the accompanying drawings in which:

FIG. 1 is a block diagram showing the overall construction of an image processing system according to a preferred embodiment of the present invention;

FIGS. 2(a)-2(f) are explanatory diagrams showing windows displayed during a process for setting file transfer data executed by an image file transfer setting unit in the image processing system of FIG. 1, wherein FIG. 2(a) shows an initial window in the process, FIG. 2(b) shows a connection settings window, FIG. 2(c) shows a process window for setting file transfer data, FIG. 2(d) shows how a pull-down list for connections is displayed on the processes window of FIG. 2(c), FIG. 2(e) shows the initial window displayed after completing settings, and FIG. 2(f) shows an advanced settings window;

FIG. 5 is an explanatory diagram showing entries in a table for file transfer data stored by the image file setting unit;

FIG. 8 is an explanatory diagram showing a folder data table according to a first modification of the embodiment;

FIG. 9 is an explanatory diagram showing a file type table according to a third modification of the embodiment;

DETAILED DESCRIPTION OF THE PREFERRED EMBODIMENT

Figure 2A:
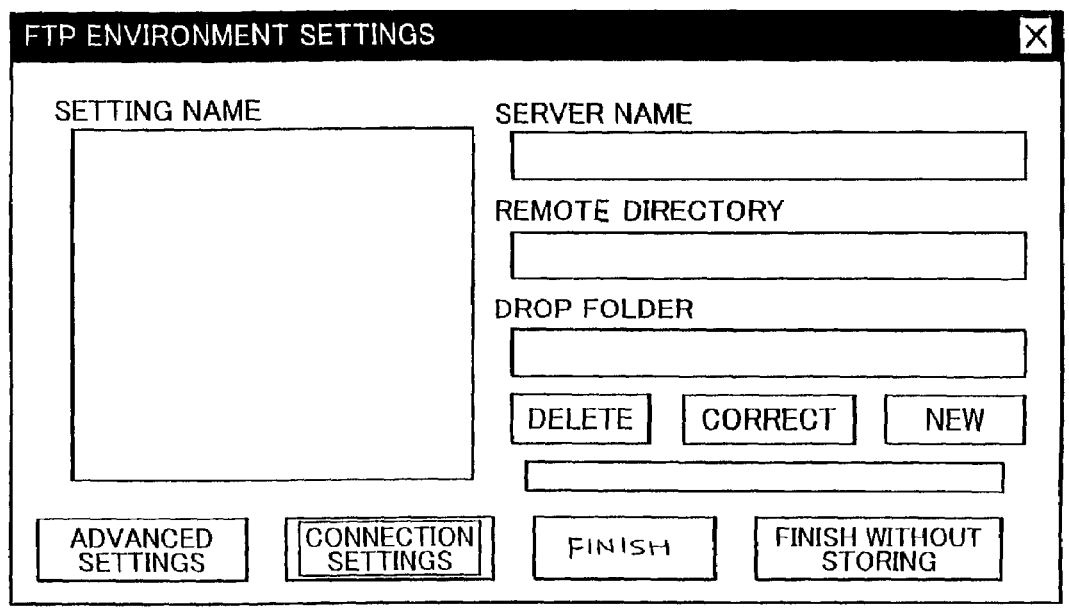

A data file transfer controlling device according to a preferred embodiment of the present invention will be described while referring to the accompanying drawings wherein like parts and components are designated by the same reference numerals to avoid duplicating description.

FIG. 1 is a block diagram showing the overall construction of an image processing system according to the present embodiment and the functional construction of each component of the system.

An image processing system 1 of the preferred embodiment includes: image file servers 10 that are personal computers or the like; and an image processing device 20 that is also a personal computer or the like. The image file servers 10 are connected to the image processing device 20 via a network 2, such as a local area network. While two image file servers 10 are connected to the network 2 in FIG. 1, the number of image file servers 10 is not limited to two.

Each of the image file servers 10 includes: a hard disk 11, an FTP server 14, and a network interface 16 connected to the network 2. Folders 12 (transfer storage areas) are provided on the hard disk 11 as storage areas for storing image files to be transferred. The image file server 10 called the image file server #1 in FIG. 1 is provided with two folders 12 (folder #11, #12), but is not limited to two. The image file server 10 called the image file server #2 is provided with a single folder 12 (folder #21). The folders 12 can also be provided elsewhere other than on the hard disk.

The FTP server 14 receives image files from other image file servers 10 via the network interface 16 and stores the files in the folders 12. The FTP server 14 can also extract image files from the folders 12 and can transmit these files to other image file servers 10 or the image processing device 20 via the network interface 16. This FTP server 14 can be implemented as a process executed by a microcomputer component in the image file server 10.

In addition, each image file server 10 is provided with a process executing unit (not shown) for executing various processes using a mouse, keyboard, display, speakers, external storage devices, and the like (not shown).

The image processing device 20 includes: an image file transfer controller 31; a hard disk 23; an image processing unit 32; a network interface 36; and a printer interface 34. The image file transfer controller 31 includes: a FTP (File Transfer Protocol) client 22, a free space determining unit 28, and an image file transfer setting unit 30.

It is noted that the hard disk 23 has a predetermined usable area (a "C" drive, for example) 23A having a fixed amount of capacity. The hot folders 24 (folders #A and #B, in this example) can be provided in the usable area 23A. The hot folders (processing storage area) 24 are storage areas for receiving and temporarily storing image files transferred from the folders 12 in the image file servers 10. A work area 26 is provided in a free space in the usable area 23A at its region other than the region where the hot folders 24 (folders #A and #B) are established. Accordingly, the capacity of the work area 26 changes according to the data amount of image files that have been transferred from the image file servers 10 and that are being temporarily stored in the hot folders 24.

The network interface 36 is connected to the network 2. The FTP client 22 is for controlling the transfer of image files and for judging whether data files exist in the holders 12 in the image file servers 10. The free space determining unit 28 is for determining whether the work area 26 meets or exceeds a required capacity C. The image file transfer setting unit 30 is for setting file transfer data indicative of the transfer source and destination of image files. The image file transfer setting unit 30 is connected to a display unit 40, such as a monitor, and an input unit 42, such as a keyboard, mouse, or the like. The image processing unit 32 is for performing image processing on image files transferred to and stored in the hot folders 24. The printer interface 34 is connected to a printer 38.

It is noted that the hot folders 24 are used by a raster image process (RIP) system. When image files are copied into these hot folders 24 and an image processing program is executed by the image processing unit 32, the files are automatically extracted, processed, and outputted on the printer 38.

In this description, two of the hot folders 24 and one work area 26 are established in the hard disk 23. However, the numbers of the hot folders 24 and the work area 26 are not limited to these numbers.

The hot folders 24 and work area 26 can be established in a usable area in one or more memory unit (not shown) other than the hard disk 23. Also in such a case, the work area 26 can be defined as a free space provided in the usable area at a location other than the hot folders 24.

The FTP client 22, free space determining unit 28, image file transfer setting unit 30, and image processing unit 32 are implemented by processes executed by a microcomputer component of the image processing device 20.

The image processing device 20 is also provided with a process executing unit (not shown) for executing various processes using a mouse, keyboard, display, speakers, external storage devices, and the like (not shown).

The image file transfer setting unit 30 is used for setting data (file transfer data) required to transfer image files from the image file servers 10 to the image processing device 20. More specifically, the image file transfer setting unit 30 creates a new set of file transfer data and adds the newly-created set of file transfer data in a file transfer data table T1 shown in FIG. 5 in the hard disk 23 or the like. One set of file transfer data includes: transfer source data indicative of a folder 12 (source), from which an image file is desired to be transferred; transfer destination data indicative of a hot folder 24 (destination), to which the image file is desired to be transferred; and authentication data for an image file server 10 on which the folder 12 indicated by the transfer source data is located.

The authentication data for one image file server 10 is used by the image processing device 20 to try accessing the subject image file server 10. More specifically, when trying accessing an image file server 10, the image processing device 20 transmits the authentication data to the image file server 10. The image file server 10 judges the authentication data, and based on the judged result, sends authentication to the image processing device 20 to permit the image processing device 20 to access the image file server 10. The authentication data for one image file server 10 includes: data of the address of the subject image file server 10; and data of a login name and a password that are used by the image processing device 20 to access the subject image file server 10.

It is noted that a user sometimes sets new file transfer data designating new file-transfer operation from his/her desired transfer source to his/her desired transfer destination. For example, when the user installs a new storage area (folder) in some image server 10, he/she has to set new file transfer data designating his/her desired file-transfer operation from the new storage area as the desired transfer source to his/her desired transfer destination. In such a case, the user activates the image file transfer setting unit 30 to initially display an initial window as shown in FIG. 2(a) on the display unit 40.

Figure 2B:
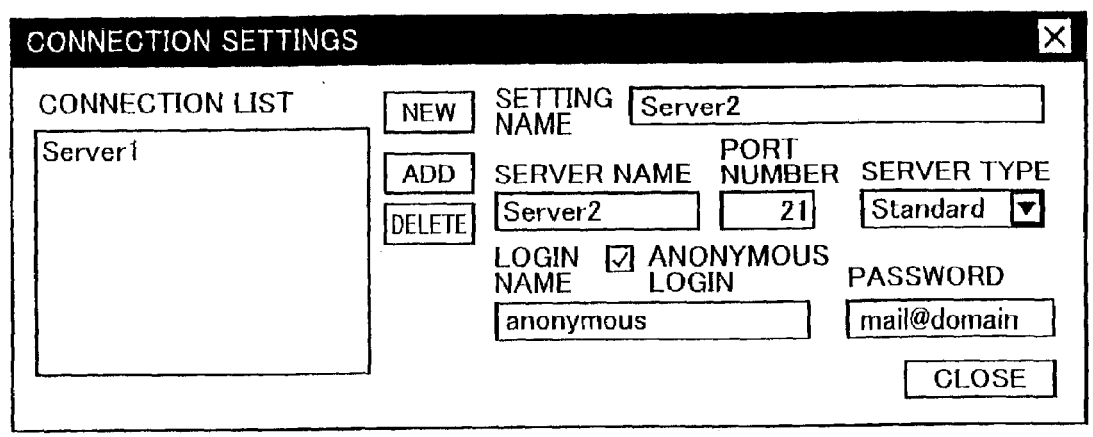

If the user installs the new folder in a new image server 10 that is newly and additionally connected to the network 2, the user has to set authentication data for accessing the new image server 10. Accordingly, he/she performs a mouse click on the button "Connection Settings" on the initial window of FIG. 2(a). As a result, the image file transfer setting unit 30 starts executing a connection data setting process of FIG. 3 by displaying a connection settings window as shown in FIG. 2(b).

It is now assumed that only the server #1 has already been connected to the network 2 and authentication data for "Server #1" has already been set, and that the server #2 is newly added to the network 2 and therefore that the user now desires to set authentication data for the new server #2. In such a case, as shown in FIG. 2(b), "Server1" is displayed in a list of settings in the window.

Accordingly, after clicking the "New" button, the user inputs in S1 the server name "Server2" in the space "Setting Name" using the input unit 42. It is noted that the image file transfer setting unit 30 determines the address of each image file server 12 by referring to its server name. Accordingly, in this case, the image file transfer setting unit 30 will determine the address of the new image file server #2 by referring to the presently-inputted server name. Also in S1, the user inputs the port number in the space "Port". The image file transfer data setting device 30 determines the type of protocol that corresponds to the inputted port number.

In S2, the user inputs the login name in the space "Login Name".

In S3, the user inputs the password in the space "Password".

In this example, the user inputs "Server2" as the "Server Name," "21" as the "Port," "anonymous" as the "Login Name," and "mail@domain" as the "Password."

Next, in S4, the user selects the type of the image file server #2 from a pull-down list. In this example, the user selects "Standard". Also in S4, if the user wishes to login anonymously, the user checks the box next to "Anonymous Login".

After input has been completed, the user clicks the "Add" button. As a result, the program proceeds to S5, in which the image file transfer setting unit 30 stores the newly inputted and determined data together in association with the inputted setting name as newly-set authentication data in the hard disk 23 or the like.

The thus newly-set authentication data includes: server address data; login name data; password data; and protocol data. In this way, the authentication data not only includes server address data, login name data, and password data but also includes data of the type of protocol desired to be used by the transfer source (image file server 10).

It is noted that the image file transfer data setting device 30 can determine not only the protocol type but also "Version" of the protocol type dependently on the user's inputted port number. Accordingly, the authentication data can additionally include the version of the protocol desired to be used by the transfer source (image file server 10).

By clicking on "Close," the window of FIG. 2(b) closes and the user is returned to the initial window of FIG. 2(a).

Figure 2C:
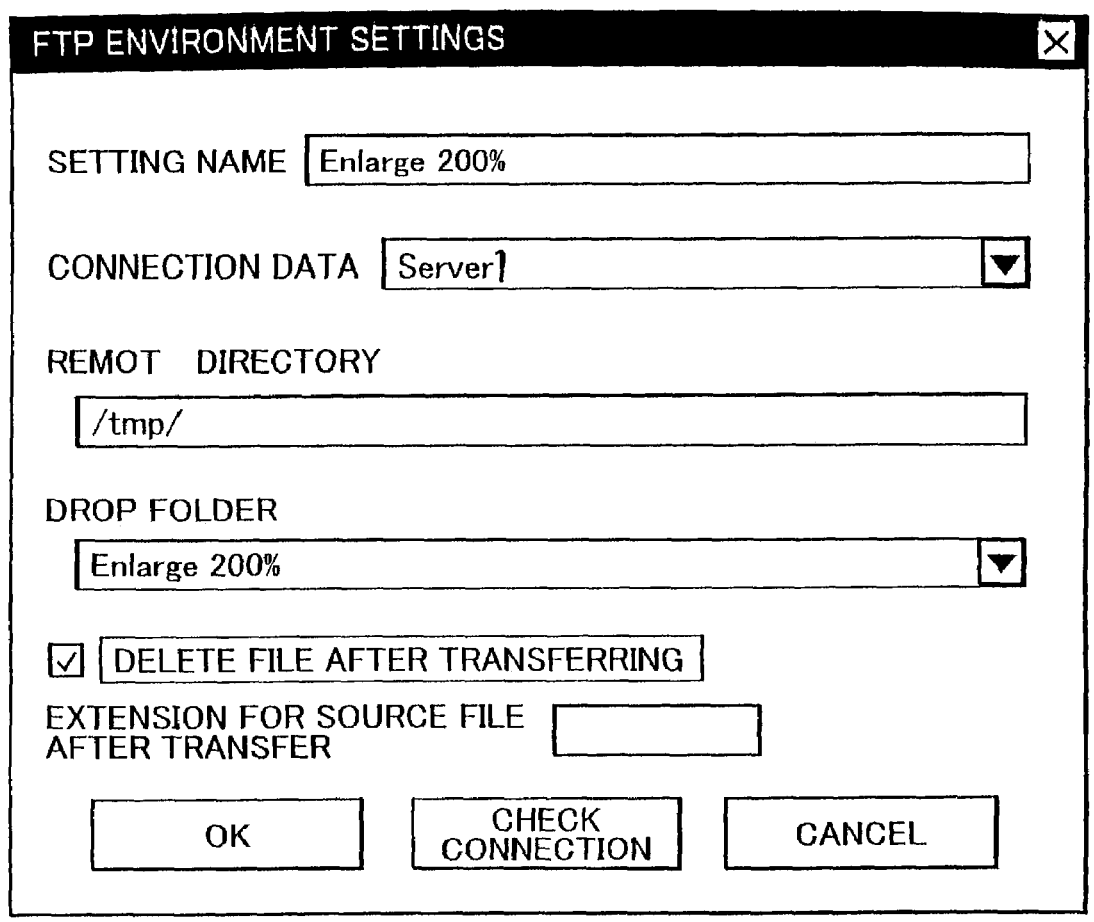

After setting the authentication data for the new image server 10, the user clicks the "New" button in the initial window of FIG. 2(a) in order to set new file transfer data. As a result, the image file transfer setting unit 30 starts executing a file transfer data setting process of FIG. 4 by displaying a file transfer setting window shown in FIG. 2(c).

Figure 3:
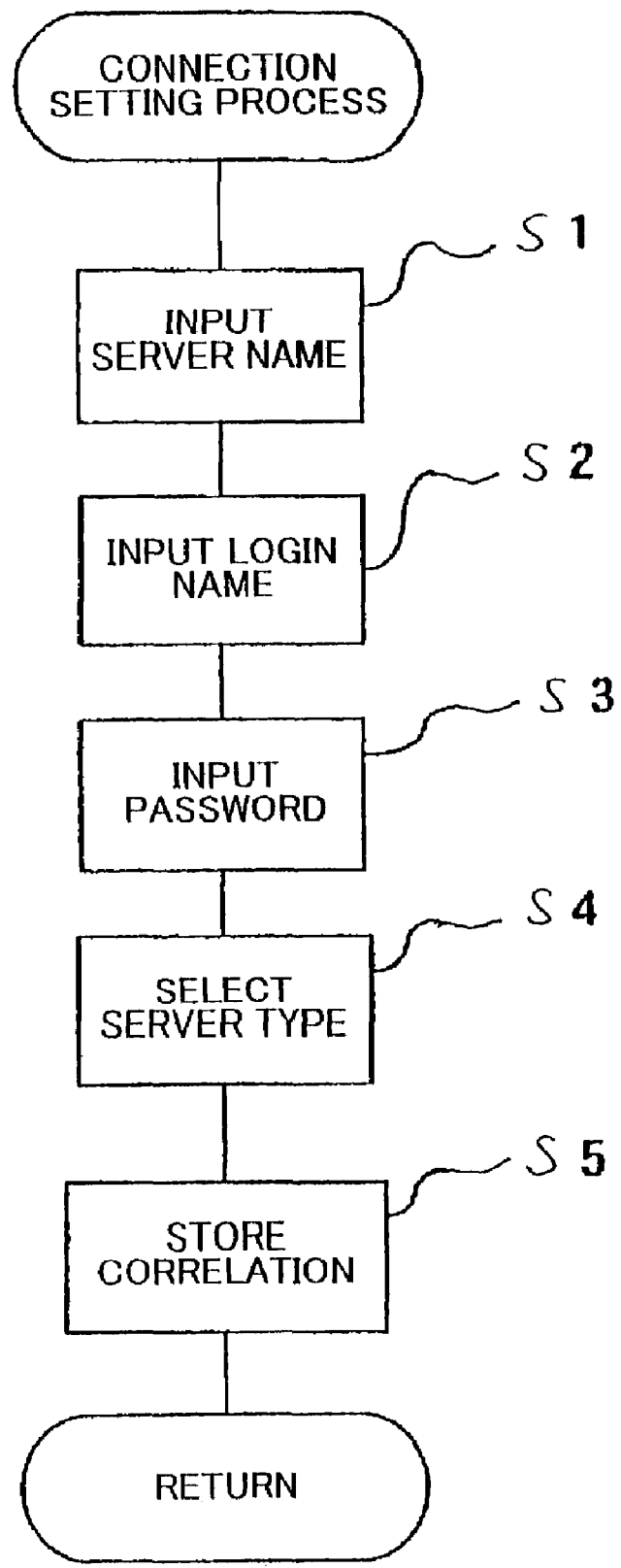
FIG. 3 is a flowchart showing a process for setting connection data executed by the image file transfer setting unit of the preferred embodiment.
Figure 4:
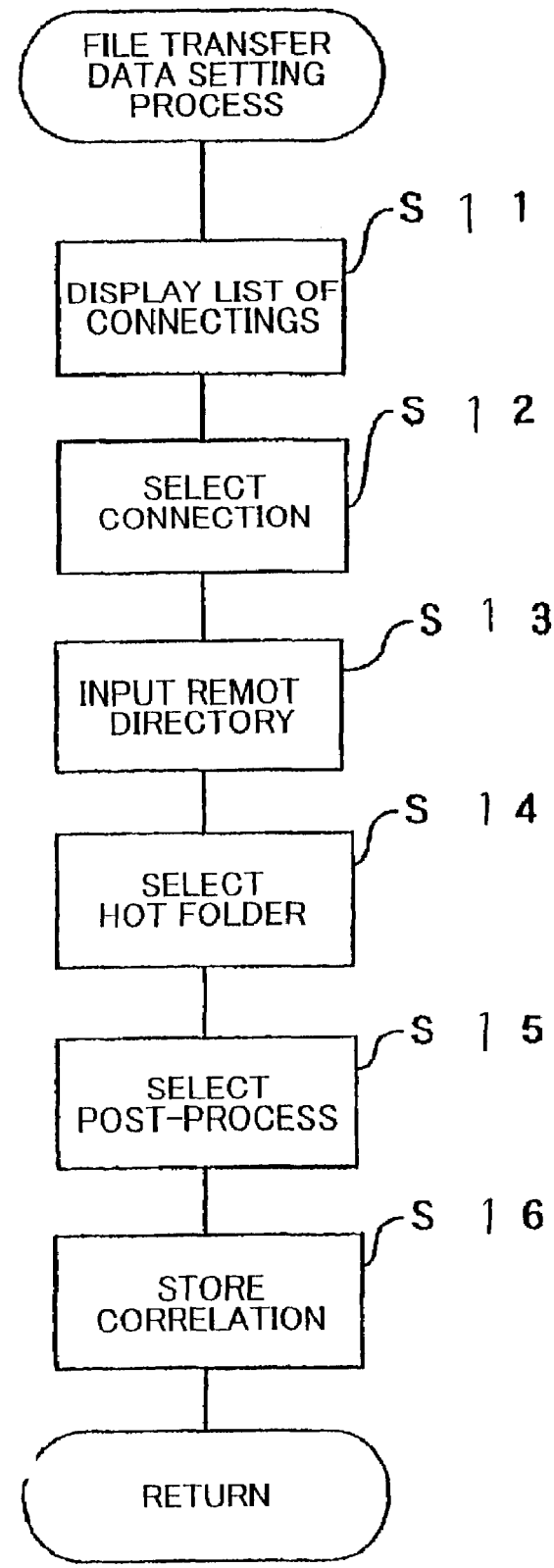
FIG. 4 is a flowchart showing a process for setting file transfer data executed by the image file transfer setting unit.

It is noted that if the user installs the new folder 12 on the image server that has already existed in the network 2, the user does not execute the connection setting process of FIG. 3, but executes the file transfer data setting process of FIG. 4 only.

It is now assumed that the user desires to set the setting name "Enlarge 200%" for the new file transfer data. The user therefore first inputs "Enlarge 200%" in the space for the "Setting Name."

Figure 2D:
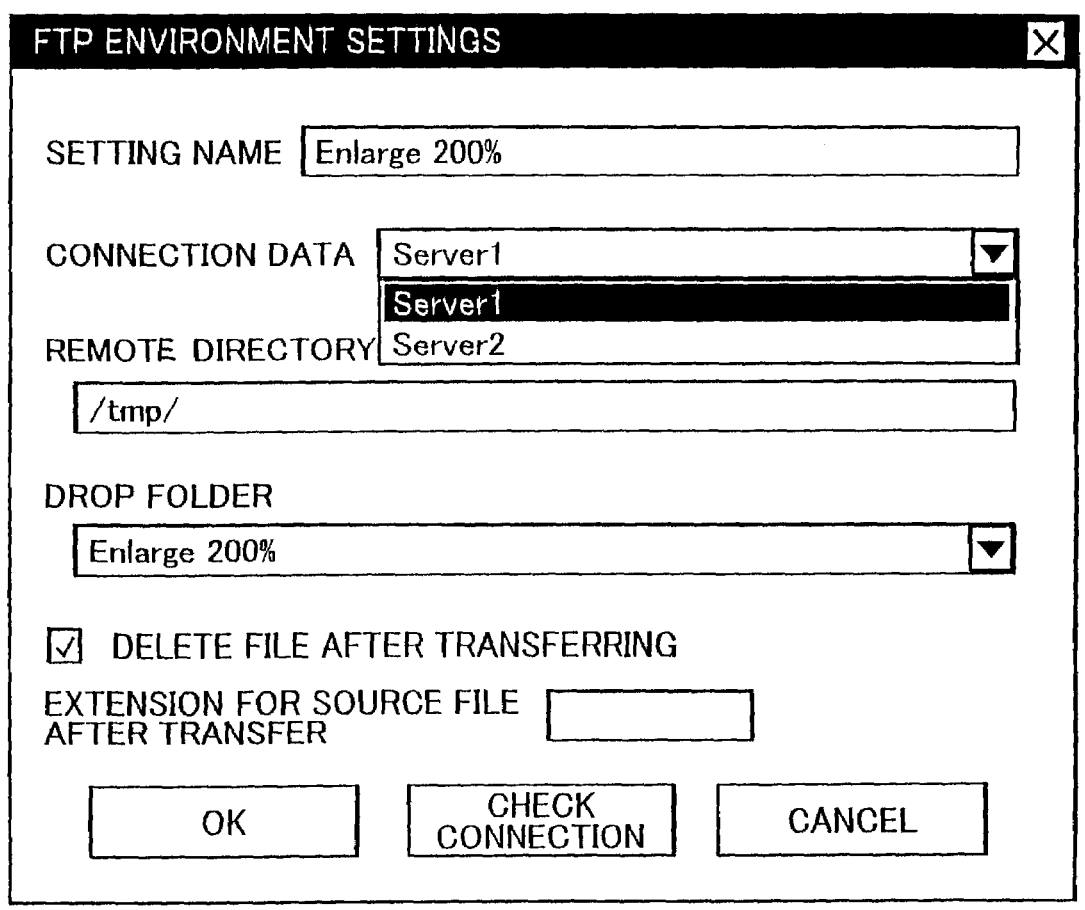

When the user clicks the pull-down list button on the right side of the "Connection" space, the image file transfer setting unit 30 refers to the file transfer data table T1 of FIG. 5, and displays in S11 a pull-down list of connections under "Connections" as shown in FIG. 2(d). In the pull-down list, the image file transfer setting unit 30 displays the server names of all the servers, whose authentication data has already been set in the file transfer data table T1. It is now assumed that the table T1 is presently storing authentication data for two servers "Server #1" and "Server #2", although FIG. 5 shows the case where the table T1 stores authentication data for four servers "Server #1", "Server #2", "Ume", and "Matsu". In such a case, the pull-down list shows the server names of the two servers "Server #1" and "Server #2" as shown in FIG. 2(d).

Next, in S12, the user selects a desired server name from the list of connections displayed in the "Connections" pull-down menu. In this example, the user selects "Server1". As a result, the image file transfer setting unit 30 sets, for the new file transfer data, authentication data for the server #1 that has already been set during the connection data setting process of FIG. 3.

Next, in S13, the user inputs, into the "Remote Directory" space, a remote directory indicative of one of the folders 12 as the desired source of transfer. In this example, the user enters "/tmp/".

In S14, the image transfer data setting unit 30 displays, in the "Drop Folder" pull-down list, a list of all the hot folders 24 already set in the table T1 of FIG. 5. The user selects a desired folder indicative of one of the hot folders 24 as the desired destination of transfer from the list of folders 24. In this example, the user selects "Enlarge 200%".

Next, in S15, the user selects a post-process setting to determine how the image file remaining in the remote directory (transfer source) will be treated after the image file is transferred from the remote directory 12 to the drop folder 24. For example, the user can enter an extension, such as ".bak," in the space "Extension for source file after transfer". In such a case, the original file will be renamed with the extension ".bak" after the transfer of the subject file is completed, which will avoid confusing this file with the image file that has been transferred. Or, the user can check the box next to "Delete file after transferring." In such a case, the source file will be deleted after the transfer of the subject file is completed.

Figure 2E:
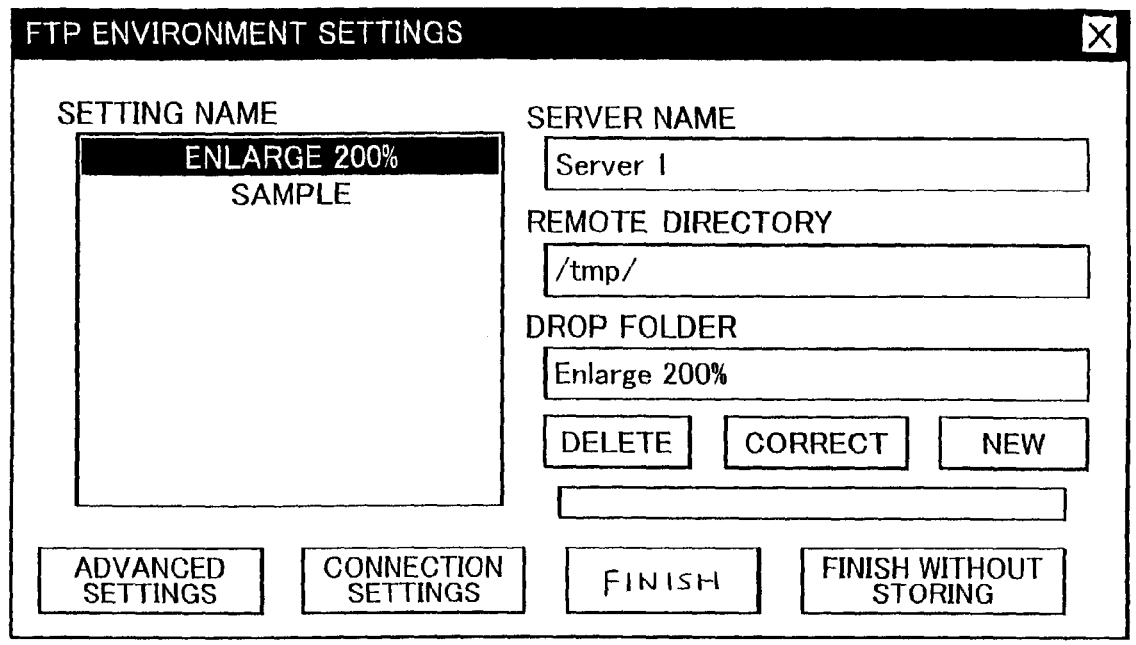

After completing input, the user clicks on the "OK" button to set the new file transfer data as shown in FIG. 2(e). As a result, the program proceeds to S16, in which the image file transfer setting unit 30 stores the inputted data as a new entry into the file transfer data table T1 of FIG. 5. The newly-set file transfer data is stored in the table T1 in a manner that its constituent setting name data, transfer source data, transfer destination data, post-process data, and authentication data (server address data, login name data, password data, and protocol data) are stored in association with each other.

In this way, the file transfer data includes data of the type of protocol desired to be used by the transfer source (image file server 10) as a part of the authentication data. The file transfer data can additionally include the version of the protocol desired to be used by the transfer source as a part of the authentication data. It is possible to expand the application scope of the image file transfer data setting device 30.

As shown in FIG. 5, the folders 12 and the hot folders 24 are associated with such functions as enlarged printing, standard printing, and the like. Accordingly, it is unnecessary to set details of the transfer source and destination each time an image file is to be transferred. It is ensured that image files transmitted from specific folders 12 to specific hot folders 24 will be automatically printed in specific printing manners.

Figure 2F:
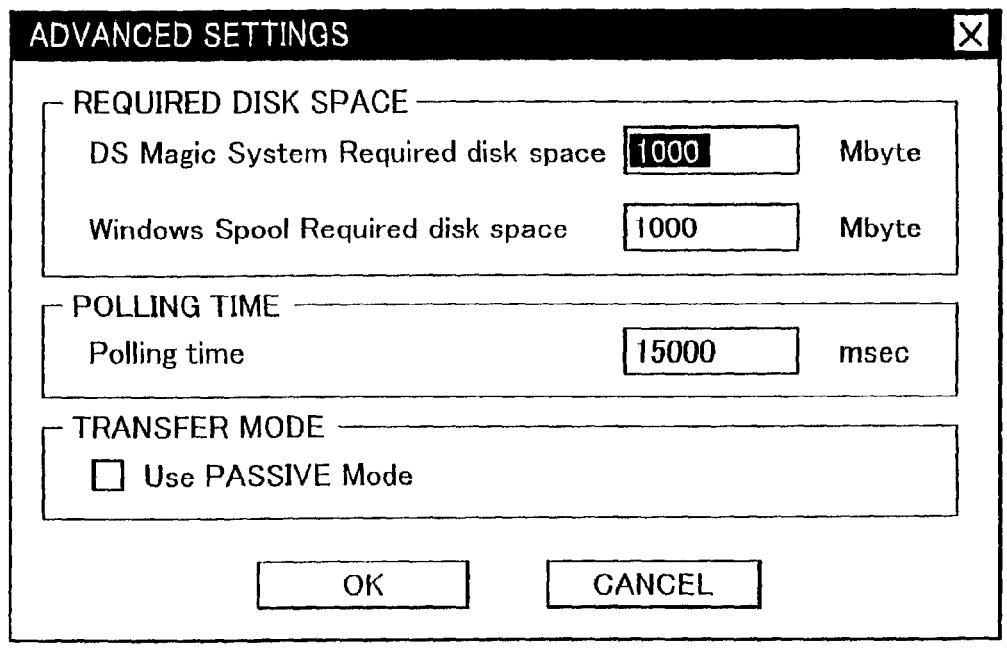

It is noted that when the user clicks on "Advanced Settings" in the initial window of FIG. 2(a), an advanced settings window is displayed as shown in FIG. 2(f). On the advanced settings window, the user can input such settings as "Required disk space", "Polling time," and "Transfer Mode". The user can input his/her desired fixed-capacity space amount S in the space "Required disk space". The user can input his/her desired waiting-time period W in the space "Polling time."

If the user checks the "Use passive mode" box under "Transfer Mode", the image file will be transferred from the transfer source to the transfer destination at a high speed. When this box is unchecked, the file will be transferred at a standard rate. In this way, the file transfer data can also include data of the operating mode desired to be used by the transfer source (image file server 10) as a part of the authentication data of the transfer source.

It is noted that the user has to know the login name or the password in order to set his/her desired authentication data during the connection data setting process of FIG. 3. However, the user can set his/her desired file transfer data during the file transfer data setting process of FIG. 4 even if he/she does not know the login name or the password. Accordingly, a system manager of the entire system 1, who knows the login name and the password, controls the image file transfer setting device 30 to execute the connection data setting process of FIG. 3. An operator, who does not know the login name or the password, can control the image file transfer setting device 30 to execute the file transfer data setting process of FIG. 4. In S11, only the server names from among the authentication data of the servers are displayed on the pull-down list. The login names or passwords are not displayed. This prevents the operator from knowing the login names or passwords of the servers. It is possible to improve the security of the login names and passwords. It is possible to easily manage the login names and passwords.

In the above description, in S13, the user inputs his/her desired remote directory set into the "Remote Directory" space. However, the image file transfer setting unit 30 may display a list of folders 12 that have been already stored in the table T1 so that the user can select in S13 his/her desired source folder 12 from the list of folders.

Similarly, in the above description, the image file transfer setting unit 30 displays in S14 the "Drop Folder" pull-down list so that the user can select his/her desired destination folder 24 from the list of folders. However, the image transfer data setting unit 30 may not display such a list in S14, but the user may simply input his/her desired client directory set into the "Drop Folder" space.

In the above description, the display unit 40 displays the pull-down list as shown in FIG. 2(d) in S11 to notify the user of the already-recorded server names. However, another method for notifying the user of the already-recorded server names is possible. For example, the already-recorded server names may be verbally reported by a speaker or the like (not shown) which is provided to the file transfer data setting device 30. There are a variety of methods that can be used for notifying the user of the already-recorded server names.

As described above, according to the present embodiment, in order for the user to set new file transfer data, the image file transfer setting unit 30 acquires authentication data from the file transfer data table T1 and displays a list of connections on the display unit 40 in S11. The user uses the input unit 42 to select a desired connection from the list in S12. The user also uses the input unit 42 in S13 and S14 to input or select a folder 12 as the transfer source and a hot folder 24 as the transfer destination. The image file transfer setting unit 30 combines this data as new file transfer data and adds the data to the file transfer data table T1 in S16.

Hence, the user can set new file transfer data using authentication data included in preset file transfer data. Accordingly, it is no longer necessary for the user to record such data in his/her notebook or the like, and the user need not perform such troublesome operations as inputting the authentication data each time via the keyboard or the like. Accordingly, it is possible to facilitate the setting of file transfer data and the management of the server authentication data.

Further, the image file transfer setting unit 30 can perform post-process settings to determine how image files remaining in the folder 12 will be handled after the image files have been transferred from the folders 12 to the hot folders 24, using such settings as deleting the files, changing the extension on the files, or the like according to the user's needs. It is also desirable to include a setting for moving the image file to another folder 12.

The image file transfer controller 31 controls transfer of image files from folders 12 to the hot folders 24. In order to determine whether or not to transfer an image file from a transfer source 12 to a destination 24 according to one set of file transfer data stored in the file transfer data table T1, the free space determining unit 28 first calculates the required capacity C based on the size of the subject image file to be transferred and the fixed-capacity space amount S. The size of the image file is the amount of data contained in the image file. The fixed-capacity space amount S has already been set on the "Advanced Settings" window of FIG. 2(f) by the image file transfer setting unit 30.

More specifically, the free space determining unit 28 calculates the amount of the required capacity C as a sum of the size of the subject image file and the fixed-capacity space amount S. The thus calculated required capacity C indicates the amount of free space 26 that is required to smoothly process the subject image file to be transferred.

The free space determining unit 28 then determines whether the present capacity or amount of the work area 26 is greater than or equal to the required capacity C. That is, the free space determining unit 28 compares the present capacity of the work area (free space) 26 with the required capacity C. In other words, the free space determining unit 28 compares, with the fixed-capacity space amount S, the capacity that the free space 26 will possess when the subject image file is stored in some hot folder 24 in the hard disk 23.

When the free space determining unit 28 determines that the capacity of the work area 26 is greater than or equal to the required capacity C, the FTP client 22 issues a transfer request to the FTP server 14 of the image file server 10, designated by the file transfer data, to transfer the subject image file based on the file transfer data. Upon receiving the transfer request, the FTP server 14 performs the image file transfer based on the file transfer data, so that the image file is transferred from a transfer source folder 12 as designated by the file transfer data to a transfer destination hot folder 24 as also designated by the file transfer data. Next, the image processing unit 32 extracts the transferred image file that is now being stored in the hot folder 24, and processes the image file using the work area 26.

The printer 38 is connected to the image processing device 20 via the printer interface 34. The image file processed by the image processing device 20 is transferred to the printer 38 via the printer interface 34 and printed by the printer 38.

It is noted that the printer 38 can be connected to the network 2 and that the image processing device 20 can be connected to the printer 38 via the network 2 other than via the printer interface 34.

Figure 6:
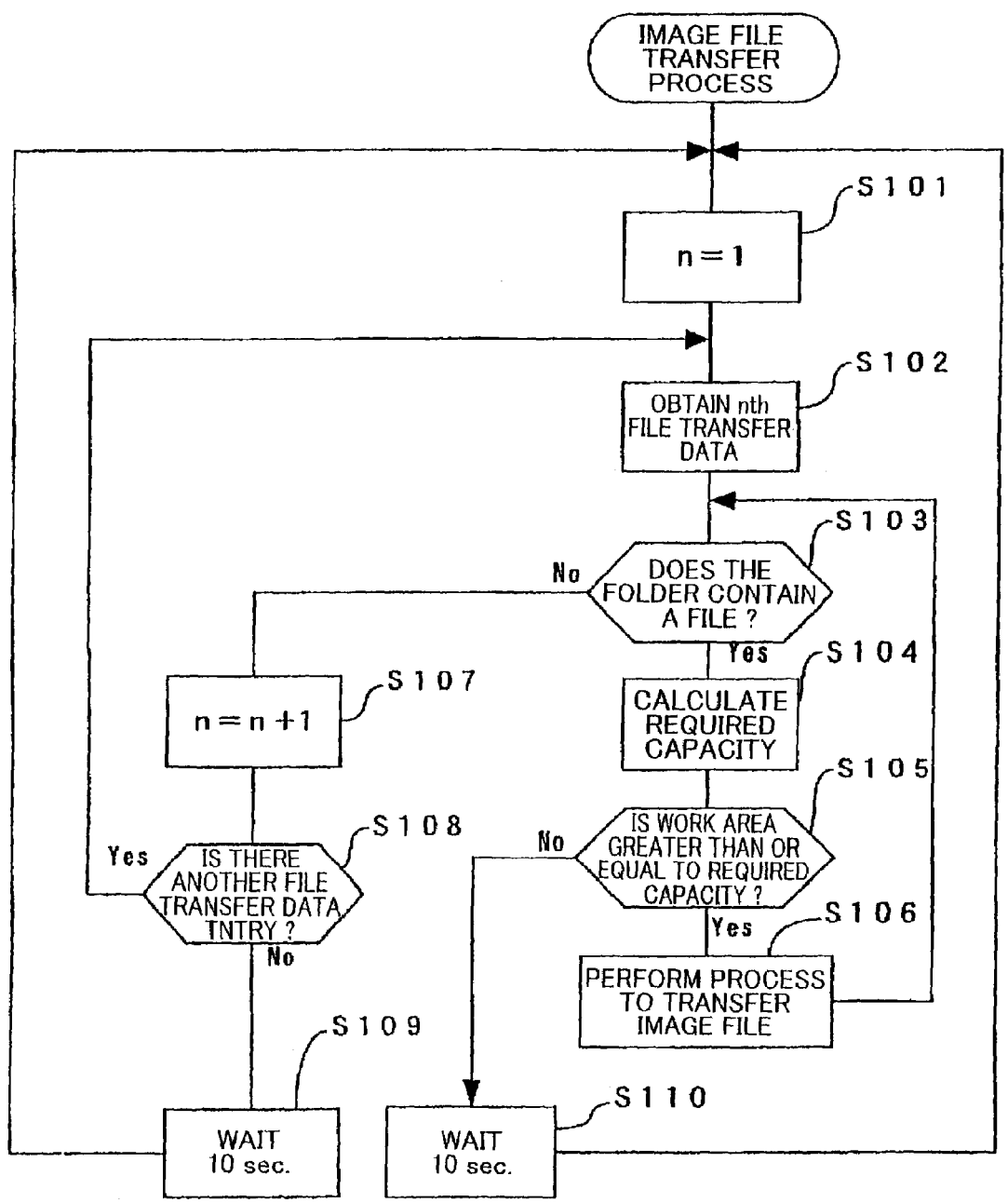
FIG. 6 is a flowchart showing an image file transferring process executed by an image file transfer controller in the image processing system of FIG. 1.

Next, the image file transfer process executed by the image file transfer controller 31 will be described with reference to the flowchart of FIG. 6.

In S101, a variable n is initialized to 1.

In S102, the nth entry of file transfer data is extracted from the file transfer data table T1 of FIG. 5. Here, n is equal to one (1) on the first instance.

In S103, the image file transfer controller 31 accesses one image file server 10 that is indicated by the server name (address) in the extracted nth entry of file transfer data. The image file transfer controller 31 accesses the image file server 10 by using the authentication data listed in the nth entry file transfer data, and receives authentication or permission from the image file server 10. The image file transfer controller 31 determines whether an image file exists in a folder 12 that is indicated by the transfer source data listed in the nth entry file transfer data and that is located on the subject image file server 10.

If some image file exists in the subject folder 12 (yes in S103), then the image file transfer controller 31 calculates the required capacity C in S104 by adding the size of the subject image file and the fixed-capacity space amount S. Then, the process advances to S105.

On the other hand, if no image file exists in the subject folder 12, then the process advances to S107 as described later.

In S105, the image file transfer controller 31 determines whether the present capacity of the work area 26 is greater than or equal to the required capacity C. If the work area 26 is greater than or equal to the required capacity C (yes in S105), the process advances to S106.

In S106 a process is executed to transfer the image file from the subject folder 12 to a hot folder 24 that is indicated by a transfer destination data listed in the nth entry file transfer data. More specifically, the FTP client 22 issues a transfer request to the FTP server 14 of the subject image file server 10 to transfer the image file based on the nth entry of file transfer data. Upon receiving this file transfer request, the FTP server 14 executes the file transfer based on the nth entry of file transfer data.

After the transfer is complete, the original image file may be deleted from the folder 12, renamed with a different extension, or the like, according to the post-process data in the nth entry file transfer data. The image file transferred to the hot folder 24 will undergo a series of image process by the image processing unit 32 in a manner described later.

Subsequently, the process returns to S103, where the image file transfer controller 31 again determines whether another image file exists. Since the image file no longer exists at this time (no in S103), the process advances to S107.

In S107, the variable n is incremented 1. In S108 the image file transfer controller 31 determines whether an nth entry of file transfer data exists in the file transfer data table TF. If the file transfer data exists, the process returns to S102, and the steps from S102 are repeated for the next file transfer data. On the other hand, if the value of the variable n is larger than the total number of file transfer data entries in the file transfer data table TF, then the process advances to S109.

In S109, the image file transfer controller 31 pauses for a waiting time, after which the processes beginning from S101 are repeated. It is noted that the length of the waiting time is equal to the waiting-time period W that has been set on the "Advanced Settings" window of FIG. 2(f) by the image file transfer setting unit 30. In this example, the waiting-time period W is set to 10 seconds.

On the other hand, if the work area 26 is less than the required capacity C in S105 (no in S105), transfer of an image file is not allowed, and the process advances to S110. As in S109, the image file transfer controller 31 pauses for the waiting time of the waiting-time period W in S110 before repeating the process from S101.

It is noted that the fixed-capacity space amount S and the waiting-time period W are set to predetermined values if the user does not set his/her desired values on the "Advanced Settings" window.

It is noted that the processes of S103 and S106 are executed by the FTP client 22, and the processes of S104 and S105 are executed by the FTP client 22 and the free space determining unit 28.

Figure 7:
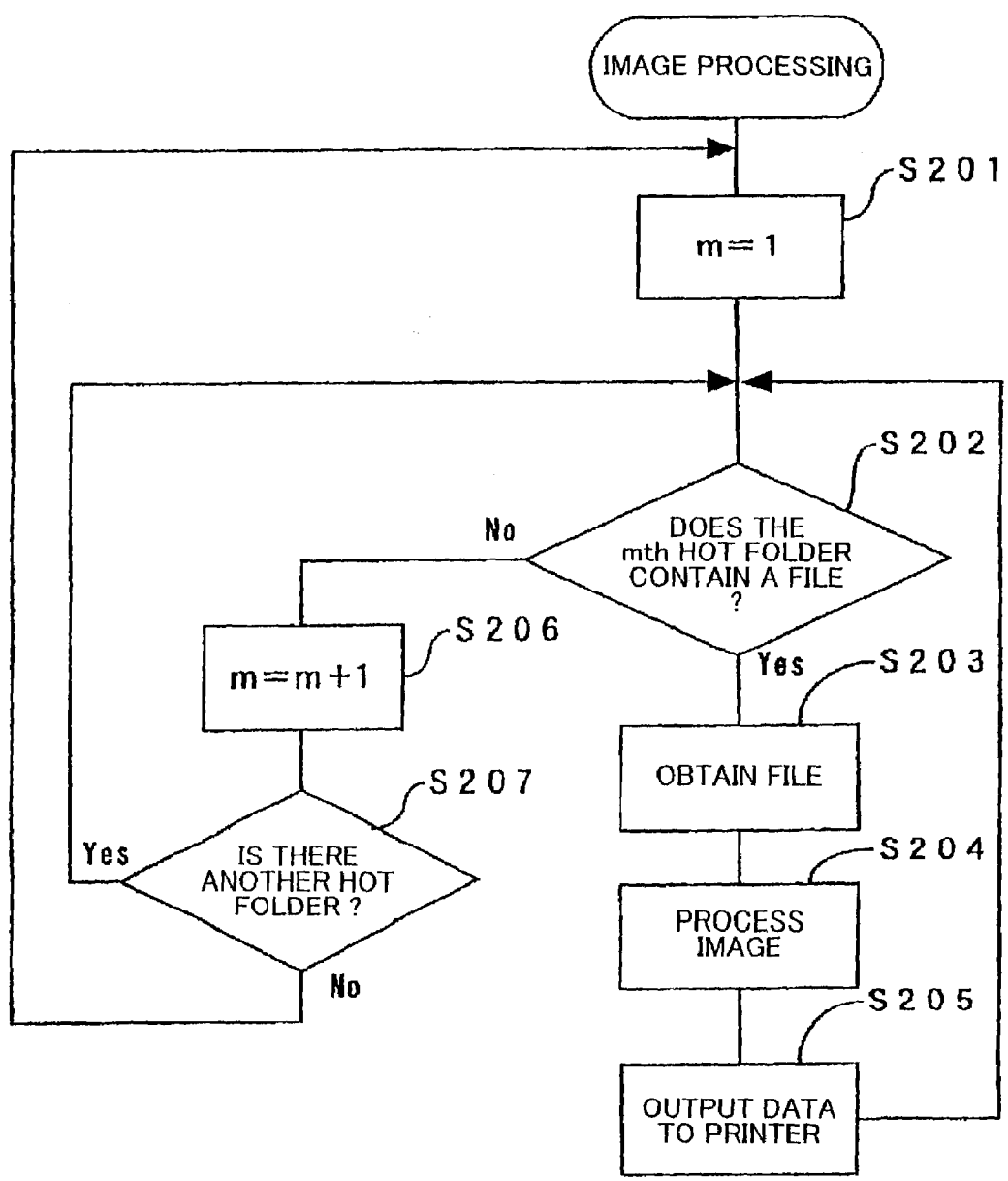
FIG. 7 is a flowchart showing an image process executed by an image processing device in the image processing system of FIG. 1.

Next, image processing performed by the image processing unit 32 will be described with reference to the flowchart of FIG. 7.

In S201, a variable m is initialized to 1.

In S202, the image processing unit 32 determines whether an image file exists in the mth hot folder 24. If an image file exists in the mth hot folder 24 (yes in S202), then the program proceeds to S203.

In S203, the image processing unit 32 extracts the image file from the mth hot folder 24.

In S204, the image processing unit 32 processes the extracted image file using the work area 26.

In S205 the image processing unit 32 transfers the processed image file to the printer 38, where the image file is printed. At this time, the processed image file and the unprocessed image file remaining in the hot folder 24 are deleted. Similarly, in the printer 38, the processed image file is deleted after being printed.

Next, the process returns to S202, where the image processing unit 32 confirms again whether some image file exists in the mth hot folder 24. Since the image file has been processed and then deleted, no image file exists at this time, and therefore the process advances to S206.

In S206 the variable m is incremented 1.

In S207, the image processing unit 32 determines whether an mth hot folder 24 exists in the image processing device 20. If the mth hot folder 24 exists, then the process returns to S202, and the processes beginning from S202 is repeated for the next hot folder 24.

On the other hand, if the value of the variable m is larger than the total number of hot folders 24, then the image processing unit 32 returns to S201 and repeats the above processes.

In the above description, the image processing system 1 is used to transfer and process image files. However, the image processing system 1 can be modified to transfer and process all types of data files, such as document files.

As described above, according to the present embodiment, when an image file exists in the folder 12 indicated to be the transfer source by the nth file transfer data, the free space determining unit 28 determines whether the work area 26 in the hard disk 23 meets or exceeds the required capacity C. If the work area 26 meets or exceeds the required capacity C, then the image file transfer process is executed. More specifically, the FTP client 22 requests an FTP server 14, which is located in an image file server 10 that includes the folder 12 indicated to be the transfer source by the nth entry of file transfer data, to transfer the image file. As a result, the image file in the folder 12 indicated to be the transfer source by the nth entry of file transfer data is transferred to the hot folder 24 that is indicated to be the transfer destination by the nth entry of file transfer data. Accordingly, it is ensured that the work area 26 required for image processing is reliably allocated in the hard disk 23 on which the hot folder 24, serving as the transfer destination, is located. Image processing can be performed without disruption, thereby increasing the stability of the image processing.

Further, when an image file does not exist on the folder 12 indicated as the transfer source in the nth entry of file transfer data, a process of S103 is not executed to determine whether the work area 26 meets or exceeds the prescribed capacity. In addition, since the image file transfer process is resumed after pausing for the waiting time following completion of the previous image file transfer process, the processing load on the FTP client 22 is reduced.

<Modifications>

Next will be described modifications of the above-described embodiment.

<First Modification>

In the embodiment described above, file transfer data is sequentially extracted from the file transfer data table T1 in the order of the entry of the file transfer data, and it is determined whether an image file exists in the folder 12 indicated by the extracted file transfer data. However, according to the present modification, priorities are set for the respective folders 12. More specifically, a folder data table T2 shown in FIG. 8 is previously set on the hard disk 23 or the like. In this example, the highest priority "1" is set to a source folder 12 " . . . /tmp/wide" on a server "Ume". It is noted that the priority of each folder has been previously set by the image file transfer setting unit 30. According to the present modification, the image file transfer controller 31 determines whether an image file exists in each folder 12 in the order from the highest priority while referring to the table T2.

<Second Modification>

In the above-described embodiment, in S104, the required capacity C is calculated based on the size of the image file to be transferred. However, according to this modification, the required capacity C is calculated based on the entire capacity of the usable area 23A in the hard disk 23, on which the hot folders 24 and the work area 26 can be prepared. For example, the required capacity C is calculated as the amount of a fixed ratio (10%, for example) of the entire capacity of the usable area 23A in order to ensure that the work area 26 can occupy at least the fixed ratio of 10%, for example, of the entire capacity of the usable area 23A.

<Third Modification>

According to the third modification, a file type table T3 of FIG. 9 is previously stored in the hard disk 23 or the like. The file type table T3 lists up a plurality of file-type coefficients K in accordance with a plurality of different file types. Representative examples of the file types are: a compressed file type, a non-compressed file type, a postscript file type, and the like. It is noted that the size of the work area 26 required to process each image file differs according to the type of the image file being processed even when each image file has the same size and therefore contains the same amount of data. Accordingly, the file-type coefficient K is set for each file type to indicate the size of the work area 26 required for processing the subject type of image file. In this example, as shown in FIG. 9, the first entry lists a file type ".tiff" and the coefficient "1". The second entry lists the file type ".ps" and the coefficient "10".

Figure 10:
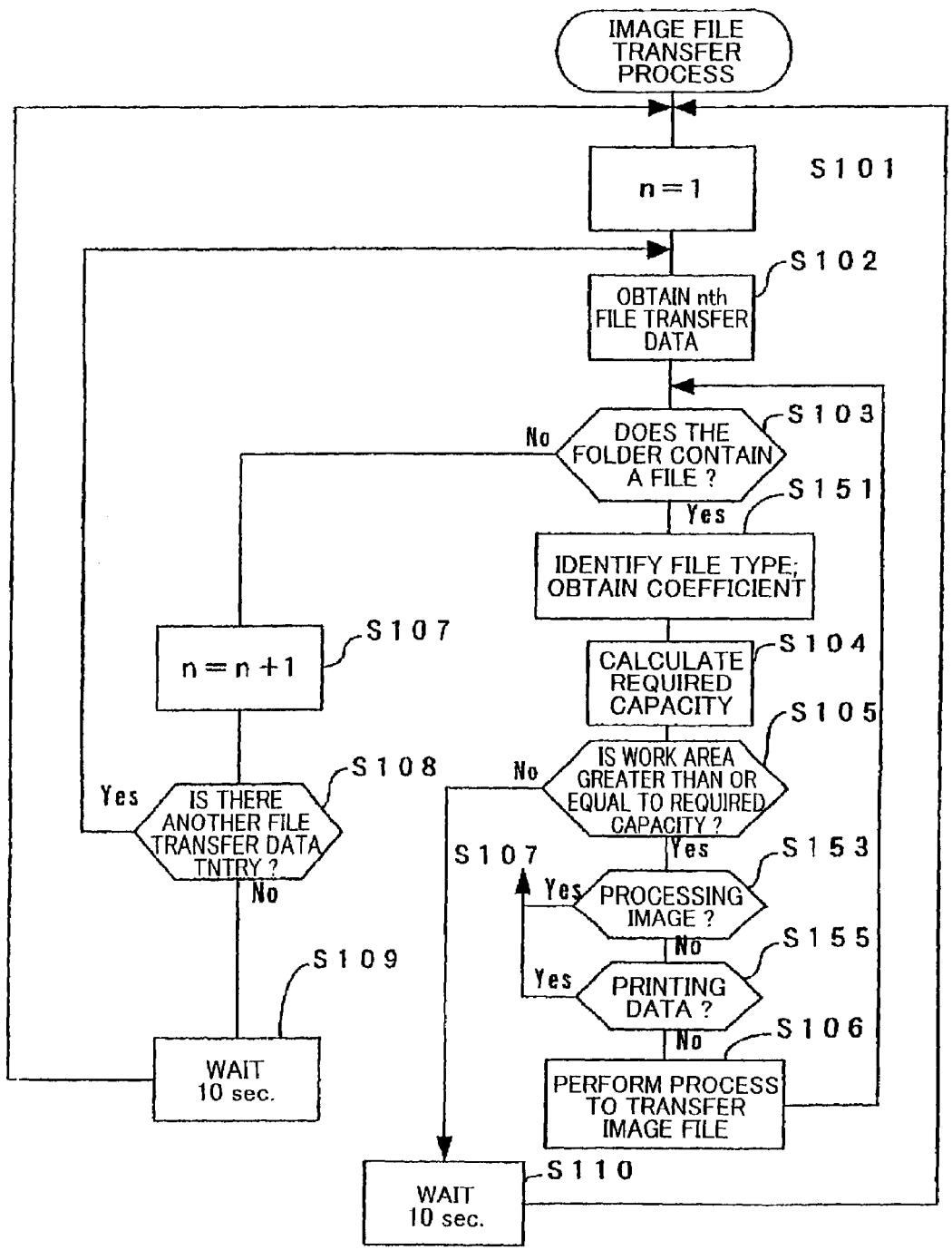
FIG. 10 is a flowchart showing a process for transferring image files executed by the image file transfer controller according to the third modification.

According to the present modification, the image file transfer controller 31 executes the image file transfer process as shown in FIG. 10. The image file transfer process of FIG. 10 is different from that of FIG. 6 in that processes of S151, S153, and S155 are added.

More specifically, after a positive determination in S103, the image file transfer controller 31 identifies the type of the image file, and extracts a file-type coefficient K for that file type from the file type table T3 of FIG. 9 in S151. In S104, the image file transfer controller 31 calculates the required capacity C by multiplying the size of the image file by the extracted file type coefficient K. With this configuration, the work area 26 required for image processing can be set to an appropriate capacity for the type of the image file to be transferred and processed.

Additionally, according to the present modification, when the present capacity of the work area 26 (free space) meets or exceeds the capacity C required for an image file transfer indicated by nth entry file transfer data in S105, then the FTP client 22 determines in S153 whether the image processing unit 32 is currently executing image processing onto an image file that has been already transferred to the image processing device 20. In this way, there is provided an additional condition for determining whether to allow an image file transfer.

When an image process is currently in progress (yes in S153), the process advances to S107 without allowing the transfer identified by the nth entry file transfer data.

While an image process is underway, the image processing device 20 transfers processed image files to the printer 38 and thereafter deletes original and processed image files, which are now unnecessary files, from the hot folder 24, thereby increasing the free space for the work area 26 by the amount equivalent to the size of the deleted files. Accordingly, it is less likely that permission to transfer image files will be denied due to lack of capacity of the work area 26. Even if permission to transfer a file is denied, by performing the image processing, it can be expected that image transfer will be allowed quickly.

When an image process is not being performed in S153 (no in S153), then in S155 the FTP client 22 determines whether the printer 38 is performing a printing process. In this way, there is provided another additional condition for determining whether to allow an image file transfer.

If a printing process is being performed (yes in S155), then the process shifts to S107 without allowing the transfer identified by the nth entry file transfer data. It is possible to reduce the load of file transfer processing on the printer 38, thereby preventing a reduction in print quality. The printer 38 will delete the processed image file after completing printing of the processed image file.

<Fourth Modification>

In the embodiment described above, the image processing device 20 with the built-in image file transfer controller 31 is connected to the network 2 as shown in FIG. 1. However, the image file transfer controller 31 can be a standalone unit or can be included in the printing device 38. It is possible to provide both the image file transfer controller 31 and the image processing device 20 in the printer 38.

Figure 11:
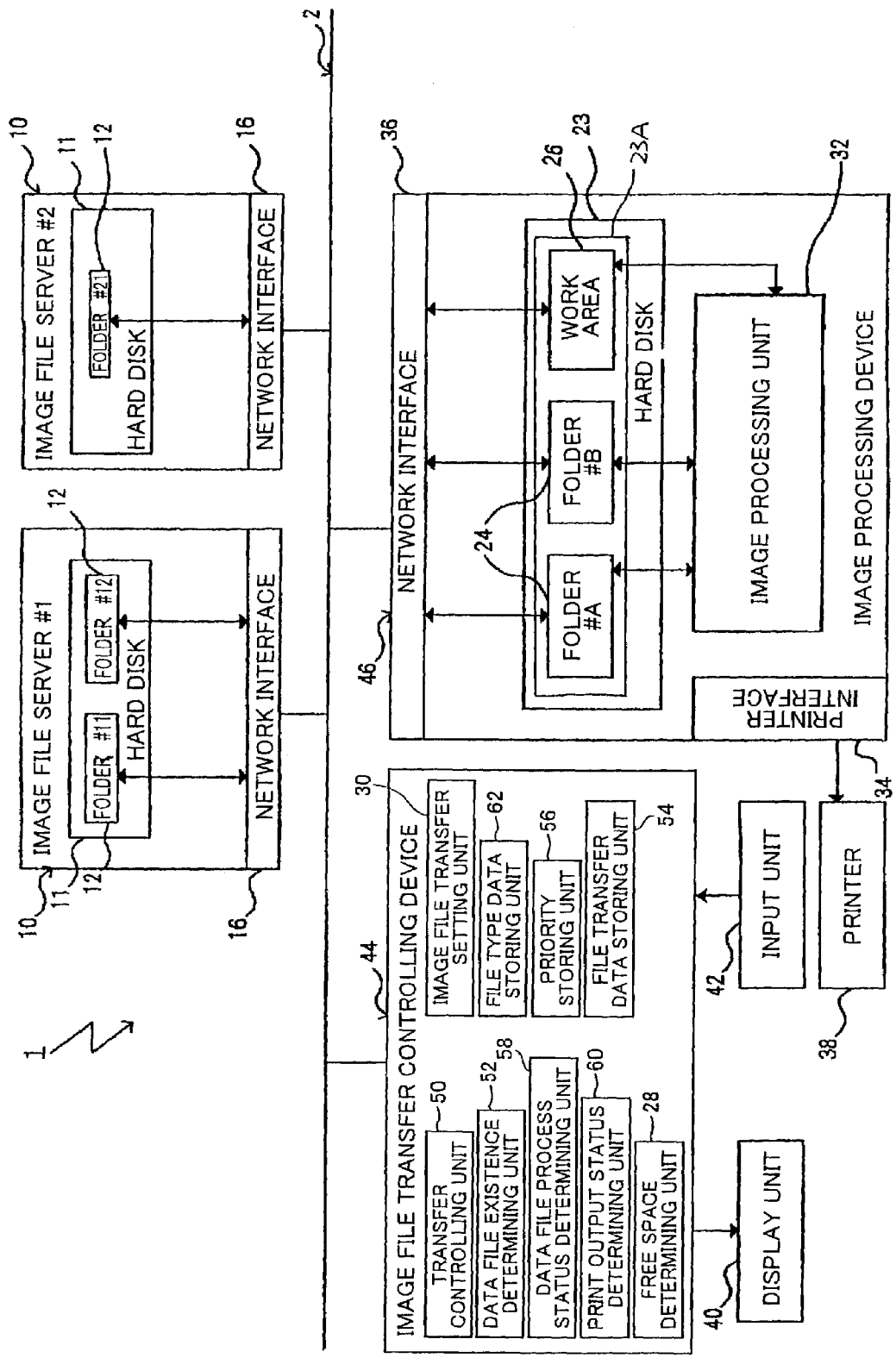
FIG. 11 is a block diagram showing the overall construction of the image processing system according to a fourth modification.

In the present modification, as shown in FIG. 11, an image file transfer controlling device 44 having functions similar to the image file transfer controller 31 of FIG. 1 can exist as a standalone unit independent from an image processing device 46. The image file transfer controlling device 44 is connected to the network 2. The image processing device 46 is constructed to include the network interface 36, the hard disk 23, the image processing unit 32, and the printer interface 34.

In this example, the image file transfer controlling device 44 includes: a transfer controlling unit 50 for controlling file transfer operation; a data file existence determining unit 52 for executing a data file existence determining process of S103, the free space determining unit 28, the image file transfer setting unit 30, and a file transfer data storing unit 54 storing the file transfer data table T1. The combination of the transfer controlling unit 50 and the data file existence determining unit 52 is equivalent to the FTP client 22 in the above-described embodiment. With this configuration, the image file transfer controlling device 44 has the same function as the image file transfer controller 31 of the above-described embodiment.

The image file transfer controlling device 44 may further include a priority storing unit 56 storing the priority table (folder data table) T2 of FIG. 8. In this case, the image file transfer controlling device 44 has the same function as in the above-described first modification.

The image file transfer controlling device 44 may further include: a data file process status determining portion 58 for executing the process of S153, a print output status determining portion 60 for executing the process of S155, and a file type data storing unit 62 storing the file type data table T3 of FIG. 9. In this case, the image file transfer controlling device 44 has the same function as in the above-described third modification.

In addition, the image file transfer setting unit 30 may be provided outside the image file transfer controlling device 44.

As described above, according to the embodiment and modifications, the data file transfer controlling device 31 allows data files to be transferred from data file servers 10 to the image processing device 20 only when the free space 26 meets or exceeds the required capacity. Here, the required capacity is the capacity of the free space that is required by the data file processing device 20 to properly and sequentially process data files. Since the area required for data file processing is reliably allocated, stability of the data file processing is increased without such problems as the data file processing stalling or an inability to perform the process.

According to the embodiment, the required capacity C is calculated based on the size of the data file to be transferred. According to the third modification, the required capacity C is calculated based on the size of the data file and a coefficient K that is set according to the file type. According to the second modification, the required capacity C is calculated based on the entire capacity of the usable area 23A, where the hot folders 24 and the work area 26 can be prepared. In the above-described example, the required capacity C is set to the fixed ratio (10% or the like) of the overall capacity of the usable area 23A. The effects of data file transfer control according to the capacity of free space as described above are amplified because the free space is used as the work area 26 for processing data files. It is noted that in the above-described embodiment and modifications, the free space 26 is used as the work area for processing the image files. However, the free space 26 may not be used as the work area.

Further, the data file transfer controlling device 31 issues a transfer request to a data file server 10 to transfer a data file when the data file transfer controlling device 31 determines to allow transfer of the data file from the data file server 10 to the data file processing device 20. Upon receiving the transfer request, the data file server 10 transfers the data file to the data file processing device 20. It is ensured that a data file will be transferred to the data file processing device 20 only when such transfer is allowed.

While the free space determining unit 28 can continuously determine whether the free space meets or exceeds the required capacity C, doing so might possibly put a large processing burden on the free space determining unit 28. Additionally, it is unnecessary to compare the free space with the required capacity C if no data file is stored in the source folder 12 as designated by the file transfer data. Hence, according to the above-described embodiment, the FTP client 22 repeatedly determines in S103 whether a data file is stored in the folder 12 designated by the file transfer data. The free space determining unit 28 determines whether the free space meets or exceeds the required capacity C only when a data file is stored in the transfer storage area. This can reduce the load on the free space determining unit 28.

The FTP client 22 determines existence of a data file in each of the plurality of folders 12. According to the first modification, a priority is set for each folder 12, and the FTP client 22 determines the existence of data files in the folders 12 in order from highest priority.

According to the above-described embodiment, the plurality of hot folders 24 exist in the data processing device 20. Accordingly, the folders 12 and the hot folders 24 are set for respective functions, such as enlarged printing and normal printing, and a correlation between these storage areas and the functions are established in the file transfer table T1 as shown in FIG. 5. Accordingly, it becomes no longer necessary to set details for the transfer source and destination each time a data file is to be transferred. The data file transfer operations can be simplified while meeting diverse needs.

The data file processing system 1 is provided with the printer 38 for printing the processed data files. The data file processing device 31 deletes the processed and unprocessed data files that are no longer necessary from the hot folders 24 after the processed data files are transferred to the printer 38. Therefore, in the third modification, it is determined in S153 whether some data file is being currently processed in order to determine whether to allow transfer of a data file. While a data file is being processed, transfer of other files is not allowed. After the data file is processed, the data file processing device 31 transfers the processed file to the printer 38 and deletes the unnecessary data file from the processing storage area 24, thereby increasing the free space 26 by an amount equivalent to the size of the deleted file. With this configuration, it is less likely that transfer of data files will not be allowed because there is an insufficient free space 26. Since the data processing continues even when a data file transfer is not allowed, it is likely that transfer of the data file will be allowed quickly.

In the third modification, it is further determined whether the printing device 38 is currently performing a printing process in order to determine whether to allow transfer of a data file. While continuing a data file processing, the data file processing device 31 transfers the processed data file to the printer 38, such as a wide format inkjet printer. However, if a data file is transferred to the printer 38 while the printer 38 is performing a printing process, a print head in the printer 38 has to frequently stop during the printing process. This will reduce print quality. Hence, according to the third modification, by not allowing file transfers while the printer 38 is executing a printing process, it is possible to reduce the file transfer processing load on the printer 38, thereby preventing a drop in print quality.

While the invention has been described in detail with reference to the specific embodiment thereof, it would be apparent to those skilled in the art that various changes and modifications may be made therein without departing from the spirit of the invention.

For example, in the above-described embodiment, the network 2 is a wired network. However, the network 2 is not limited to the wired network, but may be a wireless network, such as a wireless LAN.

The data file transfer controller 31 can be implemented by various methods. In the above-described embodiment and modifications, the data file transfer controller 31 is implemented by a computer that realizes the image processing device 20 executing the application program of FIG. 6 or FIG. 10. In other words, the data file transfer controller 31 is achieved by providing the program for directing the computer to function as the data file transfer controller 31 by having the computer execute the program.

The program for directing the computer to function as the data file transfer controller 31 can be originally recorded on a storage medium that can be read by a computer, such as a flexible disk D shown in FIG. 1, a magneto-optic disk, a CD-ROM, or a hard disk. By loading the program stored on the storage medium according to need onto a computer system and executing the program, the data file transfer controller 31 can be implemented on the computer system. The program can also be installed on the computer system via a communication line.

In addition, it is possible to record the program on a storage medium, such as a ROM or backup RAM that can be read by a computer. This ROM or backup RAM can be built into the computer.

What is claimed is:

1. A data file transfer controlling device for controlling transfer of a data file from a data file server to a data file processing device, the data file processing device processing a data file after temporarily storing the data file in a processing storage area defined in a memory area provided in the data file processing device, the data file transfer controlling device comprising:

a free space judging portion judging whether a capacity of a free space is greater than or equal to a required capacity for transfer of a data file, the free space being defined in a memory area provided in a data file processing device at a region other than a processing storage area, to which the data file is to be transferred; and a transfer controlling portion allowing the data file to be transferred from the data file server to the data file processing device when the free space judging portion determines that the free space is greater than or equal to the required capacity and failing to allow the data file to be transferred from the data file server to the data file processing device when the free space judging portion determines that the free space is less than the required capacity, wherein the data file processing device processes the data file by using the free space as a work area for processing the data file, wherein the memory area has a fixed amount of capacity, and wherein the free space judging portion determines the required capacity by calculating a sum of the size of the data file to be transferred to the processing storage area and a fixed space amount that is required to process the data file in the free space.

2. A data file transfer controlling device as recited in claim 1, further comprising a file type data storing portion storing a file type coefficient that is set for each type of data file; and wherein the free space judging portion calculates the required capacity based on the size of the data file to be transferred and the coefficient corresponding to the file type of the data file to be transferred.

3. A data file transfer controlling device as recited in claim 1, wherein the free space judging portion calculates the required capacity based on the capacity of the memory area.

4. A data file transfer controlling device as recited in claim 1, wherein the transfer controlling portion issues a transfer request to the data file server when allowing transfer of a data file from the data file server to the data file processing device, and wherein the data file server transfers the data file to the data file processing device upon receipt of the transfer request.

5. A data file transfer controlling device as recited in claim 1, wherein the data file server is provided with a transfer storage area capable of storing a data file scheduled to be transferred to the data file processing device;

the data file transfer controlling device further comprising a data file existence judging portion repeatedly judging whether some data file is stored in the transfer storage area; and wherein the free space judging portion executes its judging operation when the data file existence judging portion determines that some data file is stored in the transfer storage area.

6. A data file transfer controlling device as recited in claim 5, wherein the data file server is provided with a plurality of transfer storage areas capable of storing a plurality of data files scheduled to be transferred to the data file processing device, and wherein the data file existence judging portion executes its judging operation onto the plurality of transfer storage areas in succession.

7. A data file transfer controlling device as recited in claim 6, further comprising a priority storing portion storing priorities set for the respective transfer storage areas; and wherein the data file existence judging portion executes its judging operation onto the plurality of transfer storage areas in an order from the highest priority while referring to the priorities stored by the priority storing portion.

8. A data file transfer controlling device for controlling transfer of a data file from a data file server to a data file processing device, the data file processing device processing a data file after temporarily storing the data file in a processing storage area defined in a memory area provided in the data file processing device, the data file transfer controlling device comprising:

a free space judging portion judging whether a capacity of a free space is greater than or equal to a required capacity for transfer of a data file, the free space being defined in a memory area provided in a data file processing device at a region other than a processing storage area, to which the data file is to be transferred; and a transfer controlling portion allowing the data file to be transferred from the data file server to the data file processing device when the free space judging portion determines that the free space is greater than or equal to the required capacity and failing to allow the data file to be transferred from the data file server to the data file processing device when the free space judging portion determines that the free space is less than the required capacity, wherein the data file server is provided with a transfer storage area capable of storing a data file scheduled to be transferred to the data file processing device;

the data file transfer controlling device further comprising a data file existence judging portion repeatedly judging whether some data file is stored in the transfer storage area; and wherein the free space judging portion executes its judging operation when the data file existence judging portion determines that some data file is stored in the transfer storage area, wherein the data file server is provided with a plurality of transfer storage areas capable of storing a plurality of data files scheduled to be transferred to the data file processing device, wherein the data processing device is provided with a plurality of processing storage areas in the memory area, the free space being defined in the memory area at the region other than the plurality of processing storage areas, the data file transfer controlling device further comprising a file transfer data storing portion setting one of the transfer storage areas as a transfer source, setting one of the processing storage areas as a transfer destination, and storing a correlation of the set transfer storage area and the set processing storage area; and wherein the transfer controlling portion refers to the file transfer data storing portion, and allows, selectively dependently on the determination result by the free space judging portion, the data file to be transferred from the transfer storage area that is set as the transfer source to the processing storage area that is set as the transfer destination.

9. A data file transfer controlling device for controlling transfer of a data file from a data file server to a data file processing device, the data file processing device processing a data file after temporarily storing the data file in a processing storage area defined in a memory area provided in the data file processing device, the data file transfer controlling device comprising:

a free space judging portion judging whether a capacity of a free space is greater than or equal to a required capacity for transfer of a data file, the free space being defined in a memory area provided in a data file processing device at a region other than a processing storage area, to which the data file is to be transferred; and a transfer controlling portion allowing the data file to be transferred from the data file server to the data file processing device when the free space judging portion determines that the free space is greater than or equal to the required capacity and failing to allow the data file to be transferred from the data file server to the data file processing device when the free space judging portion determines that the free space is less than the required capacity, wherein the data file processing device processes the data file that has been transferred to and stored in the processing storage area, transfers the processed data file to the printing portion, and subsequently deletes the unprocessed data file and the processed data file remaining in the processing storage area;

the data file transfer controlling device further comprising a data file processing status judging portion judging whether the data file processing device is currently executing a file processing operation, the data file processing status judging portion executing its judging operation when the free space judging portion determines that the free space is greater than or equal to the required capacity for transfer of a data file; and wherein the transfer controlling portion allows the data file to be transferred from the data file server to the data file processing device when the data file processing status judging portion determines that the data file processing device is not currently executing a file processing operation and fails to allow the data file to be transferred from the data file server to the data file processing device when the data file processing status judging portion determines that the data file processing device is currently executing a file processing operation.

10. A data file transfer controlling device for controlling transfer of a data file from a data file server to a data file processing device, the data file processing device processing a data file after temporarily storing the data file in a processing storage area defined in a memory area provided in the data file processing device, the data file transfer controlling device comprising:

a free space judging portion judging whether a capacity of a free space is greater than or equal to a required capacity for transfer of a data file, the free space being defined in a memory area provided in a data file processing device at a region other than a processing storage area, to which the data file is to be transferred;

a transfer controlling portion allowing the data file to be transferred from the data file server to the data file processing device when the free space judging portion determines that the free space is greater than or equal to the required capacity and failing to allow the data file to be transferred from the data file server to the data file processing device when the free space judging portion determines that the free space is less than the required capacity, and a printing portion printing out a data file processed by the data file processing device;

wherein the data file processing device processes the data file that has been transferred to and stored in the processing storage area, transfers the processed data file to the printing portion, and subsequently deletes the unprocessed data file and the processed data file remaining in the processing storage area;

wherein the printing portion deletes the received processed data file after printing out the processed data file;

the data file transfer controlling device further comprising a print outputting status judging portion judging whether the printing portion is currently performing a printing process, the print outputting status judging portion executing its judging operation when the free space judging portion determines that the free space is greater than or equal to the required capacity for transfer of a data file; and wherein the transfer controlling portion allows a data file to be transferred from the data file server to the data file processing device when the print outputting status judging portion determines that the printing portion is not currently performing a printing process and fails to allow the data file to be transferred from the data file server to the data file processing device when the print outputting status judging portion determines that the printing portion is currently performing a printing process.

11. A data file processing device, comprising:

a data file processing unit including a memory area having a processing storage area, the data file processing unit processing a data file after temporarily storing the data file in the processing storage area defined in the memory area; and a data file transfer controlling unit controlling transfer of a data file from a data file server to the data file processing unit, the data file transfer controlling unit including:

a free space judging portion judging whether a capacity of a free space is greater than or equal to a required capacity for transfer of a data file, the free space being defined in the memory area provided in the data file processing unit at a region other than the processing storage area, to which the data file is to be transferred; and a transfer controlling portion allowing the data file to be transferred from the data file server to the data file processing unit when the free space judging portion determines that the free space is greater than or equal to the required capacity, the data file processing unit receiving the transferred data file and processing the received data file after temporarily storing the data file in the processing storage area, the transfer controlling portion failing to allow the data file to be transferred from the data file server to the data file processing unit when the free space judging portion determines that the free space is less than the required capacity, wherein the data file processing unit processes the data file by using the free space as a work area for processing the data file, wherein the memory area has a fixed amount of capacity, and wherein the free space judging portion determines the required capacity by calculating a sum of the size of the data file to be transferred to the processing storage area and a fixed space amount that is required to process the data file in the free space.

12. A printing device, comprising:

a data file processing unit including a memory area having a processing storage area, the data file processing unit processing a data file after temporarily storing the data file in the processing storage area defined in the memory area;

a data file transfer controlling unit controlling transfer of data file from a data file server to the data file processing unit, the data file transfer controlling unit including:

a free space judging portion judging whether a capacity of a free space is greater than or equal to a required capacity for transfer of a data file, the free space being defined in a memory area provided in a data file processing unit at a region other than a processing storage area, to which the data file is to be transferred; and a transfer controlling portion allowing the data file to be transferred from the data file server to the data file processing unit when the free space judging portion determines that the free space is greater than or equal to the required capacity and failing to allow the data file to be transferred from the data file server to the data file processing unit when the free space judging portion determines that the free space is less than the required capacity; and a printing portion printing the data file that has been processed by the data file processing unit, wherein the data file processing unit processes the data file by using the free space as a work area for processing the data file, wherein the memory area has a fixed amount of capacity, and wherein the free space judging portion determines the required capacity by calculating a sum of the size of the data file to be transferred to the processing storage area and a fixed space amount that is required to process the data file in the free space.

13. A data file transfer controlling computer program embodied in a machine readable medium, the computer program executed by a computer for controlling transfer of a data file from a data file server to a data file processing device, the data file processing device processing a data file after temporarily storing the data file in a processing storage area defined in a memory area provided in the data file processing device, the data file transfer controlling program comprising instructions to:

judge whether a capacity of a free space is greater than or equal to a required capacity for transfer of a data file, the free space being defined in a memory area provided in a data file processing device at a region other than a processing storage area, to which the data file is to be transferred; and allow the data file to be transferred from the data file server to the data file processing device when it is determined that the free space is greater than or equal to the required capacity and failing to allow the data file to be transferred from the data file server to the data file processing device when it is determined that the free space is less than the required capacity, wherein the data file processing device processes the data file by using the free space as a work area for processing the data file, wherein the memory area has a fixed amount of capacity, and the data file transfer controlling program further comprising instructions to:

determine the required capacity by calculating a sum of the size of the data file to be transferred to the processing storage area and a fixed space amount that is required to process the data file in the free space.

14. A storage medium that can be read by a computer and that stores a data file transfer controlling program executed by a computer for controlling transfer of a data file from a data file server to a data file processing device, the data file processing device processing a data file after temporarily storing the data file in a processing storage area defined in a memory area provided in the data file processing device, the data file transfer controlling program comprising the instructions to:

judge whether a capacity of a free space is greater than or equal to a required capacity for transfer of a data file, the free space being defined in a memory area provided in a data file processing device at a region other than a processing storage area, to which the data file is to be transferred; and allow the data file to be transferred from the data file server to the data file processing device when it is determined that the free space is greater than or equal to the required capacity and failing to allow the data file to be transferred from the data file server to the data file processing device when it is determined that the free space is less than the required capacity, wherein the data file processing device processes the data file by using the free space as a work area for processing the data file, wherein the memory area has a fixed amount of capacity, and the data file transfer controlling program further comprising instructions to:

determine the required capacity by calculating a sum of the size of the data file to be transferred to the processing storage area and a fixed space amount that is required to process the data file in the free space.

15. A data file transfer controlling device as recited in claim 1, further comprising an inputting portion that enables a user to input his/her desired space amount as the fixed space amount.

16. A data file processing devise as recited in claim 11, further comprising an inputting portion that enables a user to input his/her desired space amount as the fixed space amount.

17. A printing device as recited in claim 12, further comprising an inputting portion that enables a user to input his/her desired space amount as the fixed space amount.

18. A data file transfer controlling computer program as recited in claim 13, further comprising instructions for enabling a user to input his/her desired space amount as the fixed space amount.

19. A storage medium as recited in claim 14, further comprising instructions for enabling a user to input his/her desired space amount as the fixed space amount.

* * * * *